Dec. 8, 1953  E. W. DE KONING  2,661,778
TRIMMER SAW
Filed July 25, 1950
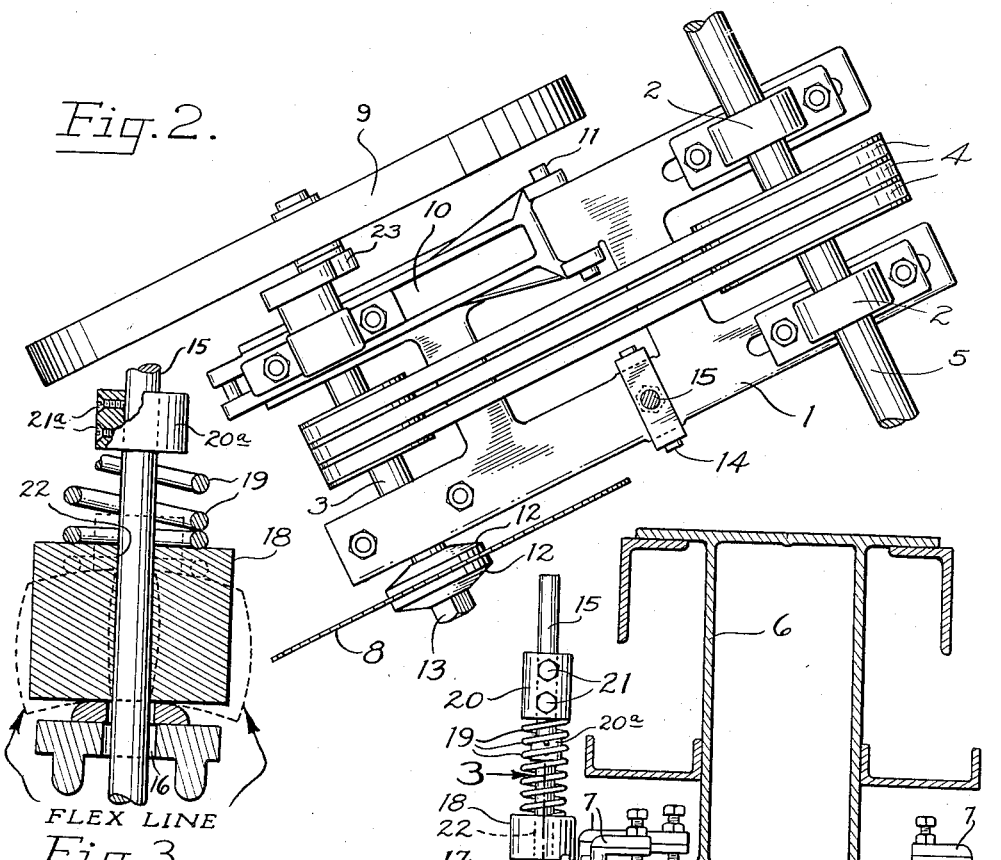
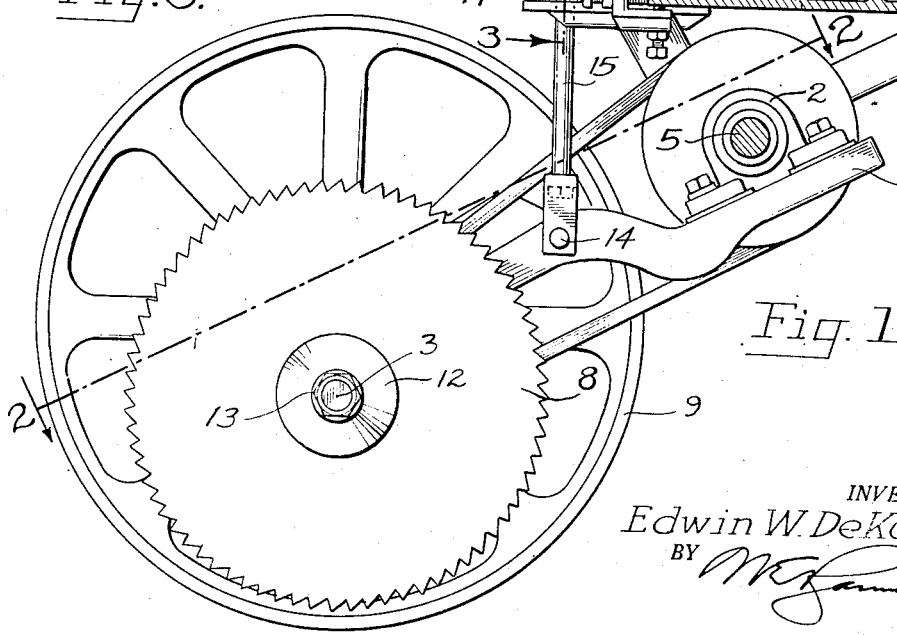
INVENTOR.
Edwin W. DeKoning
BY
Atty.

Patented Dec. 8, 1953

2,661,778

UNITED STATES PATENT OFFICE 2,661,778

TRIMMER SAW

Edwin W. De Koning, Portland, Oreg.

Application July 25, 1950, Serial No. 175,680

3 Claims. (Cl. 143—41)

This invention relates to a trimmer saw possessing a novel arrangement of parts resulting in a low overall inertia whereby the amount of lumber trimmed in a given period of time may be increased substantially. Some installations have increased production several hundred per cent.

One object of my invention is to provide a trimmer saw having substantially the entire moving mass thereof located to one side of the fixed pivot whereby all counterbalance weights are eliminated to correspondingly decrease the inertia, yet the function of such counterbalance weights is retained by employing a novel recoil and damping structure.

In the production of lumber, at which the Pacific Northwest area leads all others, the rough boards are originally cut at random lengths with the ends unsquared. To convert these boards to merchantable quality, they usually are trimmed to a predetermined length and the ends squared. A trimmer saw is a mechanism which receives boards and squares the ends while trimming to the exact desired length.

The conventional trimmer saw mechanism includes a plurality of rotary saws which are spaced at predetermined intervals and are mounted for individual selective vertical reciprocation about a common pivot as dictated by corresponding individual riding wheels. Boards are fed to this mechanism with the longitudinal length of the board perpendicular to the planes of rotation of the saws. The individual riding wheels, except those wheels associated with the two end saws, ride up over the board to pivot and lift the associated trimmer saws clear of the board and allow the board to pass, uncut, thereunder. At the same time, the two end saws remain down to trim the board. The left hand saw cuts and squares each board that passes through the trimmer saw assembly and the first saw unlifted by its rider wheel trims the right hand end of a board. Thus, the normal position of each saw is in a down or cutting position and, except when trimming, each saw merely reciprocates on a pivot as the boards pass, one by one, underneath the riding wheels. Only those saws which are adjacent the ends of a particular board are required to cut, while all other saws, intermediate thereto are riding up and down.

From the above description, it will be seen that the maximum speed at which rough boards may be fed to a trimmer saw is governed by the amount of bounce or up and down motion each saw and riding wheel is capable of describing within a given period of time. Thus, each intermediate saw must ride up over one board and drop back into and remain in accurate cutting position before the next board can be fed to the mechanism. Conventional trimmer saws possess an inherent weight which is in excess of that required properly to hold the saw down to work. Therefore, to help lift the saw and wheel when a board is encountered, counterbalance weights are secured to either (1) the saw frame mechanism or (2) the saw frame spring suspension. An example of the former construction (1) will be found in United States Patent 2,091,647, issued August 31, 1937, to F. A. Nicholson. An example of the latter construction (2) will be found in my father's United States Patent 2,016,799, issued October 8, 1935 to A. E. De Koning. It is to an improvement over these counterweighted or counterbalanced trimmer saws which I direct my invention.

One object of my invention is to provide a trimmer saw mechanism in which the weight or mass is reduced to that minimum which is commensurate with an efficient trimming operation, the entire mass is located to one side of the pivot, and no counterbalance weights are employed. Such a trimmer saw mechanism has a very low inertia and, therefore, can reciprocate at a high rate of speed. With a conventional trimmer saw, the maximum work rate has been 100,000 board feet per 8 hour shift while my trimmer saw can produce and is producing 300,000 board feet per 8 hour shift. Furthermore, rough boards are fed to a conventional high inertia mechanism at a rate of less than 40 pieces per minute whereas, with a steel frame, my mechanism can be fed 90 pieces per minute, and, with a lightweight alloy frame, my mechanism can be fed over 100 pieces per minute as long as provision is made to dampen or otherwise eliminate "bounce" from the saws.

Another object of my invention is to provide a novel recoil and damping mechanism for a trimmer saw, which mechanism includes a free-floating rod and associated resilient members which are mounted concentric with the rod axis to reduce the inertia inherent in the movement of the free-floating rod.

A further object of my invention is to provide a free-floating mechanism for a trimmer saw in which a washer, resilient element, compression spring, and collar are stacked, one on another, and concentric with said rod with said collar secured thereto to provide a minimum inertia and promote a novel damping action of the resilient element whereby the resilient element is caused to flex in three separate actions.

Yet another object of my invention is to provide a novel recoil and damping mechanism for a trimmer saw in which a loose washer with a rounded upper surface carries an annular resilient element and a compression spring of greater diameter than the washer whereby a compressive force exerted on the spring flexes the resilient element laterally and bulges the same over the rounded surface of the washer.

These and other objects and advantages of my invention will hereinafter be described with reference to the accompanying drawings, in which:

Fig. 1 is a side view, partially in section, showing a trimmer saw mechanism in which substantially the entire moving mass is located to one side of the fixed pivot;

Fig. 2 is a top view, taken substantially on the line 2—2 of Fig. 1 showing the low inertia construction of my invention; and Fig. 3 is an enlarged detailed view, taken substantially on the line 3—3 of Fig. 1, showing the resilient element, spring, and washer of my recoil and damping mechanism and indicating in dashed outline, the flexed position of the resilient element.

The trimmer saw mechanism of my invention includes a cored or hollow frame 1 which is pivoted on twin, large diameter, roller bearings 2 and carries a saw arbor 3. The saw arbor 3 is journaled, at the ends thereof, in the saw frame 1 and is rotated by a plurality of V-belts 4 which are, in turn, driven by pulleys keyed to the main drive shaft 5. Thus, the main drive shaft 5, which is secured to the fixed frame 6 by C-clamps 7, serves the dual function of (1) driving the saw arbor 3 and the rotary saw 8 and (2) providing a pivot about which the entire trimmer saw mechanism oscillates.

To one side of the saw frame 1, in conventional manner, I journal a rubber-tired riding wheel 9 by means of an arm 10 and journal 11. This riding wheel 9 rotates in a bearing 23, independent of the rotation of the saw 8, and is arranged to lift the entire saw and frame mechanism when a board is encountered. The rotary saw 8 is secured to the saw arbor 3 by means of two saw collars 12 and a nut 13. From the above description, it will be seen that substantially the entire moving mass of the trimmer saw mechanism is located to one side of the main drive shaft or pivot 5. Thus, my invention employs no counterweights to balance the mass of the saw mechanism about the pivot 5.

To one side of the saw frame 1, as at 14, I link a free floating rod 15 which is threaded through an enlarged hole 16 in the fixed frame 6. This rod 15 carries a washer 17, a resilient element 18, a compression spring 19, and an adjustable collar 20 concentric therewith and stacked, one on another, so the washer 17 bears on an extension of the fixed frame 6. If desired, the rod 15 may also carry a rubber or metal limit stop collar 20a within the spring 19. The adjustable collar 20 is secured to the free-floating rod 15 by means of two set screws 21 and is adapted to bear on the top of the compression spring 19. Similarly, the limit stop collar 20a is secured to the rod 15 by means of two set screws 21a. This limit stop collar coacts with the element 18 to define a pre-set final resting point below which the rod 15 will not travel. Thus, during the assembly of the rod and collar, the saw mechanism is dropped to the desired final resting point in position to saw a board. The spring 19 is then under compression and the stop collar 20a rests against the top of the element 18. Thereafter, the set screws 21a are tightened against the rod 15. Each final stop or resting point will then be identical with this pre-set point irrespective of the board thickness or height from which the saw drops. Furthermore, the above construction makes clear the manner in which I have reduced the inertia of the free-floating rod 15 and the mechanism associated therewith. This has been done by placing the entire mechanism concentric with the axis of the rod. That is to say, the moment of inertia of a body with respect to an axis is the algebraic sum of the products of the weight of each elementary article by the square of its distance from the axis. It is at the lowest figure when the axis passes through the center of gravity of the body. Furthermore, inertia is that property of a body by virtue of which the body tends to continue in a state of rest or motion in which it may be placed, until acted on by some external force. By arranging the elements 14, 17, 18, 19, 20, and 20a concentric with the axis of the free-floating rod 15, I have reduced the inertia of these parts to a minimum, and, accordingly, the resistance to movement or a change in direction of movement has been reduced to a minimum. This construction is far superior to the conventional counterweight construction since my low inertia elements can change direction of movement much faster.

Fig. 3 best illustrates the structure which I employ to damp out the bounce and recoil inherent in a fast-moving trimmer saw mechanism. As therein shown, the rod 15 slides up and down vertically through the enlarged hole 16, the hole in the washer 17, and the axial hole 22 in the resilient element 18. The resilient element 18 is best formed as a hollow bored cylinder of greater external diameter than the washer 17. Correspondingly, the diameter of the compression spring 19 is greater than the diameter of the washer 17. Within these critical diameters and with this critical construction, the resilient element 18 will flex as shown by the flex line in Fig. 3 when a compressive force is applied to the top thereof. In order to aid the resilient element 18 in so flexing, I prefer to round the top of the washer 17 so that the resilient element 18 will bulge or fold thereover and encompass the periphery of the washer 17. That is to say, whenever the trimmer saw mechanism is in the down position, as it is while sawing or while between boards, the free-floating rod 15 is also down and the adjustable collar 20 bears on the top of the compression spring 19 flexing the resilient element 18 into the position shown in dashed outline in Fig. 3. In this position, the resilient element 18 assumes three separate flexing functions. The first such flexing function is that of a straight compression and takes place within that portion of the resilient element 18 located between the top surface of the washer 17 and the inner periphery of the loops in the compression spring 19. The second flex function is that of an outward bend and is promoted by the axial hole 22 in the resilient element 18. The third flex function is that of folding or bulging down over the rounded upper surface of the washer 17 and takes place as a result of the correlated diameters of the washer 17, resilient element 18, and compression spring 19. Each of these flexing functions takes place before the stop collar 20a limits the rod movement. I have found that this novel combination of flexing functions is ideal to damp out the rapid bouncing of a trimmer saw mechanism and accordingly, have incorporated the structure producing these functions within one of the objects of my invention.

In the operation of my invention, it must be remembered that substantially the entire moving mass of the trimmer saw mechanism is located to one side of the pivot 5 and the overall inertia of the mechanism has been reduced to a minimum. In the initial or down position of the trimmer saw mechanism, the parts are resting as shown by the flex line and other dotted lines in Fig. 3. In this position, the compression spring 19 is fully compressed, the resilient element 18 is in the full flex position, and the stop collar 20a is in contact with the top of element 18. Thereafter, if the riding wheel 9 encounters the front edge of a board being fed into the trimmer mechanism, the saw frame 1 is lifted by the arm 10, the frame pivots about the main drive shaft 5, and the free-floating rod 15 moves vertically upward carrying with it the stop collar 20a and the adjustable collar 20. Since the spring 19 and resilient element 18 have been under compression, the first part of this upward movement of the free-floating rod 15 will be aided by the elongation of these two elements. I have correlated the construction of the resilient element 18 and the compression spring 19 so that this initial help to the upward movement of the rod 15 terminates and the spring 19 and resilient element 18 are fully expanded just prior to the instant the riding wheel 9 lifts sufficiently to ride over the top of the board. That is to say, the riding wheel 9 normally rests approximately one inch below the plane of the conveyor feeding the boards to the trimmer saw. If a board one inch thick is being fed to the trimmer saw, the total rise of the riding wheel will be two inches. I have constructed the spring 19 and resilient element 18 so that they flex and aid the initial rise of the trimmer saw, yet are fully expanded and free-floating prior to the time the mechanism has risen two inches. Thus, by way of example, the spring and resilient element may flex during the first inch or inch and one-half of the rise of the saw mechanism. During the last inch or one-half inch of rise, the riding wheel 9 must perform the entire lifting operation without the aid of the spring and resilient element. Thus, the resilient element is under compression during the initial upward movement, but, thereafter, the rod is free floating. Such a correlation of functions and elements, when made cumulative with the small inertia of the free-floating rod mechanism, results in a smooth and even movement of the trimmer saw mechanism up and over a board. Substantially all resistance to a change in movement and, correspondingly, substantially all bounce is eliminated from such a trimmer saw.

During the terminal portion of one cycle of operation of my trimmer saw mechanism, the riding wheel 9 leaves the surface of the board and drops vertically so that the saw frame mechanism pivots down about the main drive shaft 5. This drop moves the free-floating rod 15, the stop collar 20a, and the adjustable collar 20 vertically downward. During the first portion of this downward movement (by way of example, one-half or one inch) the compression spring 19 and resilient element 18 do not flex because of the aforementioned free-floating construction. The continued downward movement of the rod 15 and adjustable collar 20, however, compresses the spring 19 and causes the resilient element 18 to flex outwardly, compress, and fold over the rounded surface of the washer 17. Thereafter, as the stop collar 20a contacts the element 18, the final rest position is defined. Thus, the correlated action of the compression spring 19 and the three-fold function of the resilient element 18 bring the trimmer saw mechanism to a smooth and even stop. The exact location of the stop point may be pre-set with the stop collar 20a. Furthermore, the small inertia of the free-floating rod mechanism aids the smooth stop since the resistance to stop is measured by the inertia. I have found that this construction completely damps out the bouncing of the trimmer saw mechanism and gives a minimum recoil.

In accord with the objects of my invention, the location of substantially the entire moving mass of my trimmer saw to one side of the pivot therefor and the low overall inertia of the parts, result in a smooth and even reciprocating movement. Thus, all counterweights have been eliminated from my saw mechanism and the individual elements are cored or made concentric with the axis of movement. Furthermore, the free-floating rod mechanism and its associated concentric washer, resilient element, compression spring, and adjustable collar stacked, one on another, promotes a novel damping and recoil action. Still further, the rounded upper surface of my washer and the correlated diameters of my compression spring, resilient element, and washer, produce a unique three-function flexing action of the resilient element. Each of these functions and structures is cumulative, one with another, in producing a trimmer saw mechanism which will reciprocate at a high rate of speed. This rate of speed exceeds 100 boards a minute and results in a substantially increased output.

I claim:

1. In combination with a vertically movable trimmer saw mechanism having no counterbalance weights, yet having substantially the entire moving mass thereof located to one side of a fixed pivot, a free-floating rod means linked to the saw mechanism on said one side of the pivot to damp the downward movement of the mechanism, a frame member having a hole through which said rod is threaded for reciprocal movement, a washer surrounding said rod and supported upon said frame member, a resilient element supported upon said washer in position to fold thereover when compressed, a compression spring of greater diameter than said washer supported upon said resilient element, and a collar secured to said rod above said spring to bear thereon whereby the downward movement of said rod causes said spring to flex said resilient element laterally and bulge the same over the said washer.

2. In combination with a vertically movable trimmer saw mechanism having substantially the entire moving mass thereof located to one side of a fixed pivot, a free-floating rod means linked to the saw mechanism on said one side of the pivot to aid the upward movement and damp the downward movement of the saw mechanism, said means being the sole aid and damp mechanism for the trimmer saw and including a rod and a frame member having a hole through which said rod moves in reciprocal movement with the trimmer saw mechanism, a loose washer surrounding said rod and resting on said frame member, said washer having a rounded upper surface, a resilient element overlying and resting on said washer in position to fold about said rounded surface when compressed, a compression spring of greater diameter than said washer resting atop said resilient element, a first collar secured to said rod above said spring to bear thereon whereby the downward movement of said rod causes said spring to flex said resilient element laterally and bulge the same over said washer rounded surface, and a stop collar secured to said rod between said resilient element and said first collar, said stop collar being of less diameter than said spring to accommodate relative movement therebetween.

3. In combination with a pivotally mounted and vertically movable trimmer saw mechanism having no counterbalance weights, yet having substantially the entire moving mass thereof located to one side of the pivot, a free-floating rod means of concentric weight distribution also having no counterbalance weights, said means being linked to the saw mechanism on said one side of the pivot to aid the upward movement and damp the downward movement of the saw mechanism, said means including a rod and a fixed frame member having a hole through which said rod is threaded for reciprocal movement with the trimmer saw mechanism, a loose washer surrounding said rod and resting on said frame member, said washer having a rounded upper surface, a cylindrical resilient element overlying and resting on said washer in position to fold about said rounded surface and bulge out laterally when compressed, said resilient element being axially pierced to thread said rod therethrough and increase said lateral bulge, a compression spring of greater diameter than said washer resting atop and bearing upon said resilient element, and an adjustable collar secured to said rod above said spring to bear thereon whereby the downward movement of said rod causes said spring to flex said resilient element laterally and bulge the same over said washer rounded surface.

EDWIN W. DE KONING.

References Cited in the file of this patent

UNITED STATES PATENTS

| Number | Name | Date |
|---|---|---|
| 315,834 | Randall | Apr. 14, 1885 |
| 355,197 | Morris | Dec. 28, 1886 |
| 373,640 | Brill | Nov. 22, 1887 |
| 1,706,462 | O'Connor | Mar. 26, 1929 |
| 1,747,430 | Dorman | Feb. 18, 1930 |
| 1,780,362 | Prescott | Nov. 4, 1930 |
| 2,016,799 | De Koning | Oct. 8, 1935 |
| 2,091,647 | Nicholson | Aug. 31, 1937 |
| 2,356,962 | Williams | Aug. 29, 1944 |